(12) United States Patent
Frank et al.

(10) Patent No.: US 6,253,887 B1
(45) Date of Patent: Jul. 3, 2001

(54) METHOD AND SYSTEM FOR BRAKING A VEHICLE

(75) Inventors: Peter Frank, Stuttgart; Werner Reichelt, Esslingen; Gerhard Scheible, Weinstadt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/317,423

(22) Filed: May 24, 1999

(30) Foreign Application Priority Data

May 22, 1998 (DE) ............................................. 198 22 860

(51) Int. Cl.⁷ ..................................................... F16D 65/52
(52) U.S. Cl. ............................. 188/197; 701/70; 701/75; 701/78
(58) Field of Search .................. 188/197; 701/70, 701/75, 78, 81; 303/154

(56) References Cited

U.S. PATENT DOCUMENTS

| | | | | |
|---|---|---|---|---|
| 4,867,288 | * | 9/1989 | Simonyj | ............................... 192/1.23 |
| 5,357,444 | * | 10/1994 | Ishiguro | ........................... 364/426.01 |
| 5,400,251 | * | 3/1995 | Ishiguro | ........................... 364/426.02 |
| 5,564,797 | | 10/1996 | Steiner et al. | ..................... 303/113.4 |

FOREIGN PATENT DOCUMENTS

| | | |
|---|---|---|
| 42 07 965 | 9/1993 | (DE) . |
| 196 42 344 A1 | of 1997 | (DE) . |
| 8-91188 | 4/1996 | (JP) . |
| 9-95232 | 4/1997 | (JP) . |

OTHER PUBLICATIONS

"ATZ Automobiltechnische Zeitschrift" 99 (1997) 6, pp. 330–339.

* cited by examiner

Primary Examiner—Christopher P. Schwartz
Assistant Examiner—C. T. Bartz
(74) Attorney, Agent, or Firm—Crowell & Moring, L.L.P.

(57) ABSTRACT

In a method and apparatus for braking a vehicle by means of at least a service brake and a retarder brake, the brake pedal velocity ($v_B$) is detected and the brake pressure is increased by a control device (10) if the pedal velocity exceeds a definable activation threshold value (S). In addition, the position of an operating element of the retarder brake is detected, and the activation threshold value (S) is reduced if the position of the operating element exceeds a definable limit value (G).

5 Claims, 2 Drawing Sheets

METHOD AND SYSTEM FOR BRAKING A VEHICLE

BACKGROUND AND SUMMARY OF THE INVENTION

This application claims the priority of German patent document 198 22 860.0, filed May 22, 1998, the disclosure of which is expressly incorporated by reference herein.

The invention first relates to a method and apparatus of braking a vehicle by means of at least a service brake and a retarder brake, in which the brake pedal velocity is detected, and a control device increases the applied brake pressure if the brake pedal velocity exceeds a definable triggering threshold value.

A method and apparatus of this generic type for actively assisting a driver in emergency situations (known as a "brake assist") is disclosed, for example, in German journal *ATZ Automobiltechnische Zeitschrift* 99 (1997), 6, Page 330, and on. This brake assist utilizes the recognition that, on average, brake pedal velocities in emergency braking situations are higher by a factor 3 than in all other braking operations. The detection of the brake pedal velocity therefore permits a simple and reliable recognition of such a situation. The control unit, in coordination with an anti-lock brake system, increases the brake pressure as a function of the brake pedal velocity, to achieve optimal utilization of the vehicle braking potential for each driver, even in emergency braking situations.

In addition to the service brake, utility vehicles also have a retarder brake, which can be operated by a separate operating element, and which is constructed, for example, as an eddy current brake or as a hydraulic brake. In most cases, the driver first uses the no-wear retarder brake for braking the vehicle. When an emergency situation occurs, the retarder brake is often operated in parallel to the service brake. It was found that, when the retarder brake and the service brake, which can be operated by the brake pedal, are operated simultaneously, the brake pedal is clearly operated more hesitantly than when only the service brake is operated. As the result of such a faulty operation of the vehicle by the driver, which is inappropriate for the situation, the technically existing deceleration potential of the vehicle is not fully utilized.

It is therefore an object of the invention to provide an improved method and apparatus for braking a vehicle by means of a service brake and a retarder brake of the above-mentioned type, which achieves optimal use of the technically possible deceleration potential of the vehicle when the service brake and the retarder brake are operated simultaneously.

These and other objects and advantages are achieved by the method and apparatus according to the invention, in which the position of an operating element of the retarder brake is detected and the activation threshold value is reduced when the position of the operating element exceeds a definable limit value.

By detecting the position of the operating element of the retarder brake and reducing the activation threshold of the brake pressure when this position exceeds a definable limit value, the brake assist can be activated at a lower pedal velocity even when the retarder brake is operated simultaneously, in a manner which technically is easy to implement. As the result, the faulty operation of the vehicle by the driver which has been observed in many simulator tests (and which consists of the fact that, if the retarder brake is operated, drivers of a utility vehicle or of a tour bus step less hard and less fast onto the brake pedal of the service brake) can be counteracted in a particularly advantageous manner.

In most cases, the retarder brake is operated by means of a lever arranged on the steering wheel. Accordingly, in an advantageous embodiment of the invention, either the operating path of such a retarder lever is detected, or the control signal for the retarder triggering is detected.

The activation threshold and the limit value of the operating path of the retarder lever are advantageously determined, for example, by simulation tests. An advantageous embodiment provides that the activation threshold is reduced by 20% to 40% (preferably by 30%) when the operating path exceeds a limit value of 67% of the maximal operating path.

The invention also provides a device for braking a vehicle by means of a service brake and a retarder brake, having a sensor for detecting the brake pedal velocity and having a control unit which increases the brake pressure if the detected brake pedal velocity exceeds a definable triggering value. In this manner, the invention provides a system which is technically simple. When the service brake and the retarder brake are operated simultaneously, the control unit determines and emits a control signal for brake pressure which results in an optimal deceleration of the vehicle. For this purpose, another sensing device detects the position of an operating element of the retarder brake, and provides a signal to the control device, which can reduce the triggering threshold value if the position of the operating element exceeds a limit value.

It is particularly advantageous that this arrangement requires only one additional sensor for detecting the operation of the operating element of the retarder brake. The signal supplied by this sensor can be processed in the control unit of the brake assist, which is already present, and can therefore virtually be displaced to the "program level".

It is preferably provided that the operating element is a retarder lever, and that the additional sensing device detects the lever path of the retarder lever.

Other objects, advantages and novel features of the present invention will become apparent from the following detailed description of the invention when considered in conjunction with the accompanying drawings.

DETAILED DESCRIPTION OF THE DRAWINGS

Figure 1:
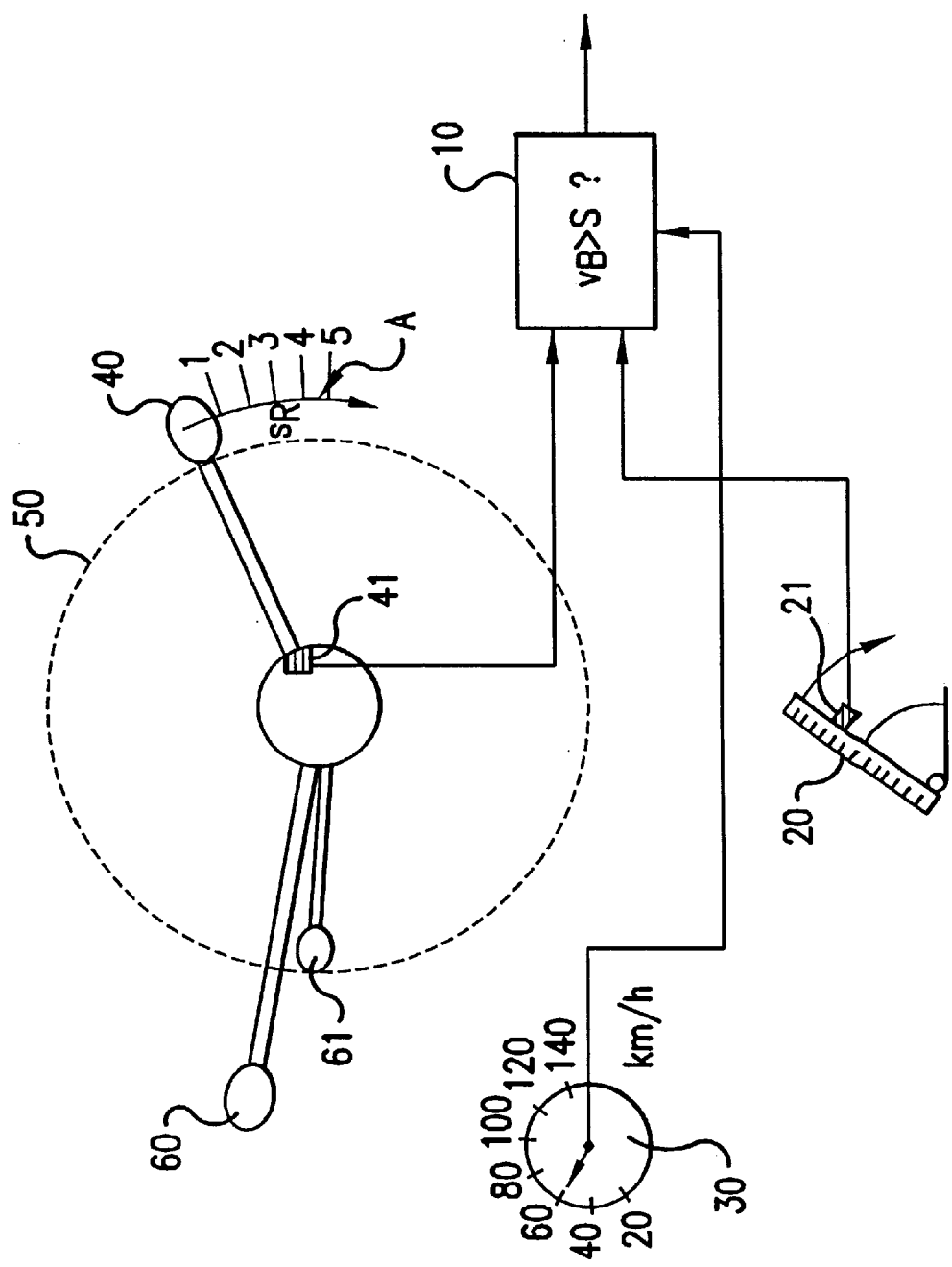
FIG. 1 is a schematic view of a system according to the invention for braking a vehicle.

Referring to FIG. 1, in a system for braking a vehicle according to the invention, a sensor 21 detects the velocity $v_B$ of a brake pedal 20, which is supplied to a control unit 10 in a manner which is known per se, and described, for example, in the German journal *ATZ Automobiltechnische Zeitschrift* 99 (1997), 6, Page 330–339. In addition, a vehicle speed $v_F$ is detected by a speed indicator 30 and supplied to the control unit 10, also in a manner known per se.

In addition to the service brake to be operated by the brake pedal 20, the utility vehicle also has a so-called retarder brake; that is, a wear-resistant brake, which may be constructed, for example, as an eddy current brake or a hydraulic brake. This retarder brake is operated by a retarder lever 40 which is provided on a steering wheel 50 of a vehicle together with other operating levers, such as a turn signal lever 60 or a lever 61 for an automatic cruise control. To operate the retarder brake, the retarder lever 40 is pulled down as illustrated in FIG. 1 by the arrow A, for example, in defined steps 1, 2, 3, 4, 5 in which the retarder lever engages slightly in each case.

Another sensing device 41, which detects the retarder lever path $s_R$, is arranged on the retarder lever 40. The output signal of the sensor 41 is also supplied to the control unit 10. Alternatively, the control signal for the retarder brake may also be supplied to the control unit 10.

As a function of the movement of the retarder lever 40 along the lever path $s_R$, or of the control signal for the retarder brake, the triggering threshold value S for the activation of the brake assist BA is reduced in the control unit 10, so that a lower brake pedal velocity $v_B$ is sufficient to cause the control unit 10 to carry out a braking operation with increased brake pressure when the retarder brake is operated by pulling the retarder lever 40.

In the case of a simultaneous operation of the retarder brake and of the brake pedal 20 by the driver (in other words, already at a lower brake pedal velocity), a conclusion is drawn concerning an emergency braking situation in which the braking operation is aided by the brake assist in that the control unit increases the brake pressure.

Figure 2:
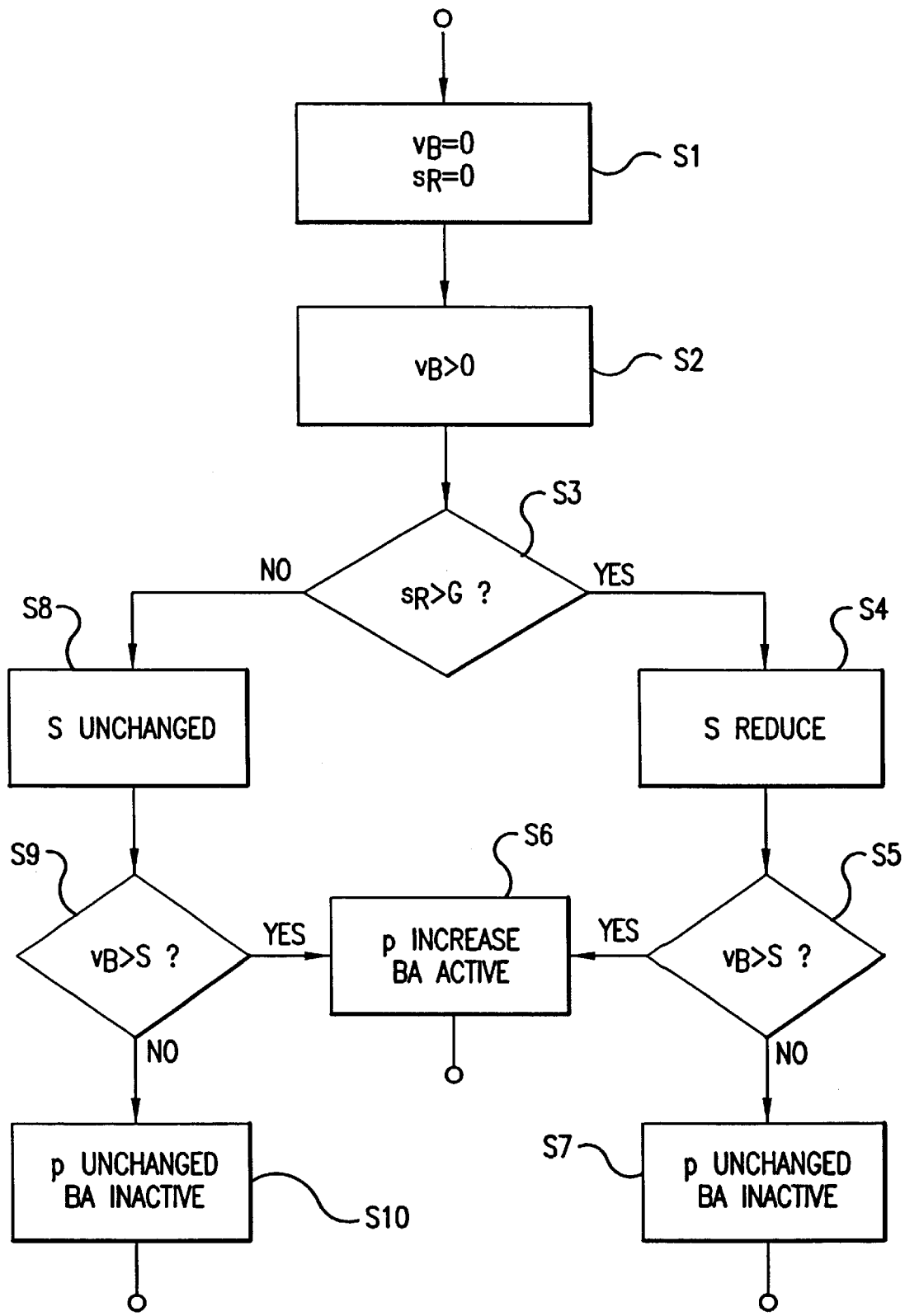
FIG. 2 is a schematic flow chart of a method according to the invention for braking a vehicle.

A method for braking a vehicle with a service brake and a retarder brake by means of the system illustrated in FIG. 1 is illustrated in FIG. 2. In the starting situation (step S1), no braking operation takes place; that is, neither the braking pedal 20 nor the retarder lever 40 are operated, so that $v_B=0$ and $s_R=0$. If the vehicle is now braked in a step S2 by means of the service brake, $v_B>0$. As soon as this occurs, it is queried in step S3 whether the retarder lever 40 is exceeding a defined limit value G, that is, whether $S_R>G$. If so, in step S4, the triggering threshold value S of the brake assist for increasing the brake pressure p is reduced by the control unit 10 (for example, by 30%).

In the subsequent step S5, it is examined whether the brake pedal velocity $v_B$ is higher than the triggering threshold value ($v_B>S$). If so, the brake pressure p is increased in step S6 and the brake assist BA is active. If not, however, the brake pressure p remains unchanged and the brake assist BA is inactive, as illustrated in step S7.

If, on the other hand, the lever path $S_R$ is below the limit value G, the triggering threshold value S remains unchanged (step S8). Also in this case, it is examined in step S9 whether the brake pedal velocity is higher than the triggering threshold value S ($v_B>S$). If so, the brake pressure p is increased in step S6, as described above, and the brake assist BA is active. If not, however, the brake pressure p remains unchanged and the brake assist BA is inactive (step S10). As illustrated by the above-described sequence of the method, the brake assist is activated if the lever path $s_R$ is smaller than the limit value G as well as if the lever path $s_R$ is larger than the limit value G. However, in the latter case, the triggering threshold value S is reduced (for example, by 30%) relative to the former case, so that the brake assist BA is activated earlier; that is, the brake pressure p for the control device 10 is increased earlier.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for braking a vehicle having at least a service brake actuated by a brake pedal for applying service brake pressure, and a retarder brake actuated by an operating element, said method comprising:

detecting an actuation velocity of the brake pedal for applying service brake pressure;

detecting the position of the operating element for the retarder brake;

a control unit increasing service brake pressure applied by the service brake if a detected actuation velocity of the brake pedal exceeds a predetermined activation threshold value; and said control unit reducing the predetermined activation threshold value if a detected position of the operating element of the retarder brake exceeds a predetermined limit value.

2. Method according to claim 1, wherein in said second detecting step, movement along an operating path of a retarder lever arranged on the steering wheel is detected, or a control signal for retarder triggering is detected.

3. Method according to claim 2, wherein the activation threshold value is reduced by 20% to 40%, if a detected position of the operating element along the operating path exceeds a limit value of 67% of the maximal operating path.

4. Apparatus for braking a vehicle having a service brake actuated by a brake pedal for applying service brake pressure, and a retarder brake actuated by an operating element, said apparatus comprising:

a control unit;

a first sensing device for detecting brake pedal velocity when said brake pedal is actuated, and having an output supplied to the control unit; and a second sensing device for detecting the position of an operating element of the retarder brake, and having an output supplied to the control device; wherein the control unit increases service brake pressure applied by the service brake if a detected brake pedal velocity exceeds a predetermined activation threshold value; and the control device reduces the predetermined activation threshold value if a detected position of the operating element exceeds a definable limit value.

5. System according to claim 4, wherein:

the operating element is a retarder lever; and the second sensing device detects a position of the retarder lever along a lever path.

* * * * *